US010927257B2

(12) United States Patent
Nazar et al.

(10) Patent No.: US 10,927,257 B2
(45) Date of Patent: *Feb. 23, 2021

(54) COMPOSITIONS AND METHODS FOR THE INTRODUCTION OF ELASTOMERIC REINFORCEMENT FIBERS IN ASPHALT CEMENT CONCRETE

(71) Applicants: FORTA CORPORATION, Grove City, PA (US); Jennie R. Lovett, Harrisville, PA (US)

(72) Inventors: Scott T. Nazar, Harrisburg, PA (US); Jeffrey B. Lovett, Harrisville, PA (US); Martin Doody, Grove City, PA (US); Christopher P. Lovett, Harrisville, PA (US)

(73) Assignee: FORTA, LLC, Grove City, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/519,096

(22) Filed: Jul. 23, 2019

(65) Prior Publication Data

US 2019/0345337 A1 Nov. 14, 2019

Related U.S. Application Data

(63) Continuation of application No. 15/049,476, filed on Feb. 22, 2016, now Pat. No. 10,392,508.

(60) Provisional application No. 62/118,677, filed on Feb. 20, 2015.

(51) Int. Cl.
*C08L 95/00* (2006.01)
*D01F 6/84* (2006.01)
*C08L 75/08* (2006.01)

(52) U.S. Cl.
CPC ............. *C08L 95/00* (2013.01); *C08L 95/005* (2013.01); *D01F 6/84* (2013.01); *C08L 75/08* (2013.01); *C08L 2205/16* (2013.01); *C08L 2207/04* (2013.01); *C08L 2555/28* (2013.01)

(58) Field of Classification Search
CPC ....................................................... E01C 5/12
See application file for complete search history.

(56) References Cited

U.S. PATENT DOCUMENTS

| | | | |
|---|---|---|---|
| 3,930,100 A * | 12/1975 | McDonald | C08L 95/00 428/323 |
| 4,550,330 A | 10/1985 | Fowler | |
| 4,556,338 A | 12/1985 | Fahey | |
| 5,460,649 A | 10/1995 | Strassman | |
| 5,872,186 A | 2/1999 | Ang | |
| 6,139,955 A | 10/2000 | Girgis | |
| 6,769,459 B2 | 8/2004 | Ohara | |
| 2006/0217466 A1* | 9/2006 | Matsuoka | C04B 26/16 524/59 |
| 2010/0066121 A1 | 3/2010 | Gross | |
| 2014/0303287 A1 | 10/2014 | Li et al. | |
| 2014/0303288 A1* | 10/2014 | Lovett | C04B 26/26 524/5 |

FOREIGN PATENT DOCUMENTS

WO 9414896 A1 7/1994
WO 2014151973 A1 9/2014

OTHER PUBLICATIONS

Ko, Introduction to Nanofiber Materials, Appendix I—Terms and unit conversion, University of British Columbia, Vancouver, Cambridge University Press (Jul. 2014), pp. 259.
Mather and Wardman, The Chemistry of Textile Fibres, The Royal Society of Chemistry, (Dec. 2011) pp. 188, 197.
International Searching Authority, International Search Report and Written Opinion for International Application No. PCT/US2016/018852, dated May 6, 2016.
Extended European Search Report—16753210.0-1102 / 3259238 PCT/US2016/018852.

* cited by examiner

*Primary Examiner* — Christopher M Rodd
(74) *Attorney, Agent, or Firm* — Eckert Seamans Cherin & Mellott LLC; Carol A. Marmo

(57) ABSTRACT

The present invention relates to elastomeric polymer fiber reinforced asphalt cement concrete for use in a variety of applications. In particular, the reinforcement fibers are effective to reduce or preclude voids and/or cracks formed in the asphalt upon placement and to render a self-healing property to the placed asphalt.

14 Claims, No Drawings

COMPOSITIONS AND METHODS FOR THE INTRODUCTION OF ELASTOMERIC REINFORCEMENT FIBERS IN ASPHALT CEMENT CONCRETE

CROSS-REFERENCE TO RELATED APPLICATIONS

This application is a continuation of U.S. patent application Ser. No. 15/049,476 filed Feb. 22, 2016, entitled "Compositions and Methods for the Introduction of Elastomeric Reinforcement Fibers in Asphalt Cement Concrete", which claims priority under 35 U.S.C. § 119(e) to U.S. Provisional Patent Application Ser. No. 62/118,677, filed Feb. 20, 2015, entitled "Compositions and Methods for the Introduction of Elastomeric Reinforcement Fibers in Asphalt Cement Concrete", which are herein incorporated by reference.

FIELD OF THE INVENTION

The present invention relates to reinforcement fibers and methods of introducing and distributing reinforcement fibers into asphalt cement concrete, and, more particularly, to reinforcement fibers composed of elastomeric material, which provide a self-healing property to field placed asphalt cement concrete.

BACKGROUND OF THE INVENTION

Various reinforcement fibers and their use in a wide variety of applications are known in the art. For example, it is known to add reinforcement fibers to building materials, such as, asphalt cement concrete and the like, to add strength, toughness, and durability, and to improve the integrity of the asphalt properties. In some applications, reinforcement fibers are added to asphalt to reduce or prevent cracks. Typical reinforcement fibers include asbestos fibers, glass fibers, steel fibers, mineral fibers, natural fibers, synthetic fibers, such as polymer and aramid fibers, and cellulose fibers. Some reinforcement fibers are better suited for particular applications than others. For example, asbestos fibers are known to provide effective reinforcement but, due to environmental and health concerns, these fibers are not extensively used. In addition, some fibers are relatively expensive and therefore, not practical for all applications.

Reinforcement fibers are incorporated into the building materials, such as, asphalt cement concrete, using a variety of conventional methods and techniques. For example, it is known to add reinforcement fibers to an asphalt cement concrete composition during the manufacturing process prior to field placement. For example, in a batch process wherein a mixing machine is used to produce asphalt, reinforcement fibers are added to a mixing chamber having mixing blades, with other ingredients. In a continuous process that uses a drum mixer, the reinforcement fibers are added to the drum mixer. The reinforcement fibers may be added to equipment other than the mixing chamber and the drum mixer. In general, the reinforcement fibers may be added to any associated machinery positioned either before or after the mixing machine or the drum mixer provided that the machinery has the capability to provide sufficient mixing and dispersion of the reinforcement fibers in the asphalt composition. In some instances, the reinforcement fibers are added prior to introducing the liquid asphalt. In other instances, such as, for micro-surfacing and slurry seal, the reinforcement fibers are added simultaneously with other ingredients in the asphalt mixture.

The reinforcement fibers are added to a cement concrete composition either individually or in a bundle or in a container, e.g., bag, coating or the like. Generally, it is advantageous for the reinforcement fibers to be added in a manner that is effective to reduce or minimize entanglement and clumping, and to improve or maximize distribution throughout the composition.

Further, reinforcement fibers can be added to an asphalt cement concrete composition in varying amounts. Typically, the amount added is such that desired properties of the reinforced asphalt are achieved upon field placement.

There is a continuous desire and need in the art to improve the ability of reinforcement fibers to disperse uniformly within an asphalt cement concrete composition, as well, as the ability to provide improved strength, toughness and durability to cement concrete when it is field placed. For example, there is a desire to provide reinforcement fibers that have elastic or stretchable properties that are capable to improve the strength, toughness and durability, and essentially to provide a self-healing property, to field placed asphalt cement concrete.

It is recognized in the asphalt cement concrete industry that there are cracking problems associated with micro-surfacing (MS), which consists of applying a layer of new pavement over existing pavement. Cracking in the MS layer can occur within only months following its placement. There is a need for a more flexible, non-cracking MS treatment, however, there is also a concern that if the MS is too soft, it will rut. Thus, the elastomeric polymer reinforcing fibers of the invention are capable of retarding crack propagation and promoting self-healing to extend pavement life in conventional MS or can be designed with softer binder to reduce rut potential. Reducing cracks in the MS layer can prevent water intrusion, which is known to cause significant damage to highways.

SUMMARY OF THE INVENTION

In one aspect, the present invention provides a reinforcement composition including a plurality of reinforcement fibers composed of an elastomer, e.g., elastomeric polymer. The elastomeric polymer can be selected from a wide variety of elastomers known in the art and, in general, includes a material that is capable of deforming e.g., stretching or elongating, when a force is applied to the material and then, substantially resuming, e.g., reverting back, to its original shape or configuration when the force is removed. The elastomeric polymer can include material having an aspect ratio from about 20 to about 5,000. Further, the plurality of reinforcement fibers can each have a denier from about 20 to about 1500 and a length from about $\frac{1}{16}$-inch to about 3 inches. In certain embodiments, the reinforcement fibers are composed of synthetic polymer including polyurethane, such as, spandex. Further, the elastomeric polymer can include natural polyisoprene and synthetic polyisoprene. The elastomeric polymer can be selected from polybutadiene, chloroprene rubber, polychloroprene rubber, butyl rubber, styrene-butadiene rubber, nitrile rubber and mixtures thereof. In certain embodiments, the elastomeric polymer can be selected from ethylene propylene rubber, ethylene propylene diene rubber, epichlorohydrin rubber, polyacrylic rubber, silicone rubber, fluorosilicon rubber, fluoroelastomers, perfluoroelastomers, polyether block amides, chlorosulfonated polyethylene, ethylene-vinyl acetate and mixtures thereof.

The elastomeric polymer can be scrap, trim or other material that, if not used in the invention, would be considered waste and disposed of appropriately, such as, but not limited to, disposal in a landfill. This form of the elastomeric polymer is referred to herein as recycled material.

In certain embodiments, the reinforcement composition can further include a plurality of non-elastomeric reinforcement fibers, which are mixed or blended with the plurality of elastomeric polymer reinforcement fibers. The non-elastomeric reinforcement fibers may be composed of polymer, such as, but not limited to, polyolefin, aramid, polyester, nylon and mixtures thereof. Polyolefin can include, but is not limited to, polyethylene, polypropylene and mixtures thereof.

The plurality of reinforcement fibers can be in a form selected from individual fibers, a bundle of fibers, a container of fibers and combinations thereof. The container can be in the form of a wrap, layer, film, coating or bag. The container may be constructed of a material that at least partially melts, dissolves, disintegrates or breaks apart to release the reinforcement fibers into an asphalt cement concrete composition. In certain embodiments, the container can be composed of polyolefin, such as polypropylene, polyethylene and mixtures thereof.

The plurality of elastomeric polymeric fibers can serve as a carrier/buffer material for the plurality of non-elastomeric fibers.

The plurality of reinforcement fibers is introduced and distributed into asphalt cement concrete prior to its field placement. Upon placement and thereafter, the elastomeric reinforcement fibers promote or provide a self-healing property to the placed asphalt. Thus, in another aspect, the present invention provides a self-healing asphalt that includes a plurality of reinforcement fibers including elastomeric polymer, and aggregate.

In still another aspect, the present invention provides a method of producing reinforced asphalt cement concrete. The method includes providing aggregate, providing a plurality of reinforcement fibers including elastomeric polymer and, introducing and distributing the reinforcement fibers into the aggregate to produce reinforced asphalt cement concrete.

The elastomeric polymer reinforcement fibers can be added at various steps during the manufacture process and further, can be added prior adding liquid asphalt or coincident with all ingredients of the asphalt mix.

DETAILED DESCRIPTION OF THE INVENTION

The present invention broadly relates to asphalt cement concrete, reinforcement fibers, methods of making fiber-reinforced asphalt cement concrete compositions, and methods of using the compositions for field placement applications. At least a portion of the reinforcement fibers added to the asphalt cement concrete compositions includes elastomeric polymer.

As used herein and the claims, the term "fiber(s)" is meant to include materials and forms that are traditionally understood by one of ordinary skill in the art to constitute a fiber as well as materials having an aspect ratio from about 20 to about 5,000. The fiber(s) in accordance with the invention have a denier from about 20 to about 1500 and a length from about 1/16-inch to about 3 inches.

As used herein and the claims, the terms "cement concrete" and "asphalt" mean asphalt cement concrete. The term "asphalt cement concrete" refers to the use of asphalt cement. The term "cement" refers to the binder that holds together the concrete. As used herein, the cement also can be referred to as "binder" or "liquid asphalt." The term "concrete" refers to a gradation of fine and coarse aggregate, such as, but not limited to sand and rock.

As used herein, the term "elastomeric polymer" and related terms, such as, "elastomer", "elastic polymer" and the like, generally refer to any material that is able to substantially resume its original shape when a deforming force is removed. When force is applied to an elastomer, molecules straighten out in the direction in which they are pulled and upon release, the molecules spontaneously return to their normal compact, random arrangement. This property is often referred to as elastic or stretchable.

It is known in the art that an elastomer is a polymer with viscoelasticity, e.g., having both viscosity and elasticity, as well as, very weak inter-molecular forces, low Young's modulus and high failure strain as compared with other materials. Elastomeric polymers can include polyurethanes, polyesters and, co-polymers and mixtures thereof. In certain embodiments, suitable reinforcement fibers for use in the invention include fibers composed of synthetic polymer, e.g., long-chain synthetic polymer, which includes polyurethane, such as but not limited to, at least about 85% polyurethane. For example, a synthetic fiber that is made up of long chain polyurethane-containing polymer is known in the art as spandex or elastane, and may be commercially available under the trade name LYCRA®. In general, the synthetic polyurethane-containing polymer, e.g., spandex, can be prepared by reacting monomer, such as but not limited to, polyester, with diisocyante to form a pre-polymer. The pre-polymer undergoes chain extension, such as, by reaction with diamine, is cured and then drawn out to produce the resulting fibers.

The term "elastomer" is often used interchangeably in the art with the term "rubber", including natural and synthetic rubber. Elastomers are usually thermoset materials, which require curing, e.g., vulcanization, but may also be thermoplastic. Long polymer chains cross-link during curing, e.g., vulcanizing. The elasticity is derived from the ability of the long chains to reconfigure themselves to distribute an applied stress. Covalent cross-linkages ensure that the elastomer will return to its original configuration when the stress is removed. As a result of this flexibility, elastomers can reversibly extend from about 5 to about 700%, depending on the specific material composition. At ambient temperatures, elastomers are relatively soft and deformable. Each of the monomers which link to form the polymer is usually made of carbon, hydrogen, oxygen and/or silicon.

In addition to the polyurethane-containing synthetic polymer fibers, e.g., spandex fibers, the present invention includes fibers composed of other elastomers, e.g., rubbers. Non-limiting examples include unsaturated rubber that can be cured by sulfur or non-sulfur vulcanization, such as, but not limited to, natural polyisoprene, e.g., cis-1,4-polyisoprene natural rubber and trans-1,4-polyisoprene gutta-percha, synthetic polyisoprene, polybutadiene, chloroprene rubber, polychloroprene rubber, butyl rubber, e.g., copolymer of isobutylene and isoprene, styrene-butadiene rubber, e.g., copolymer of styrene and butadiene, nitrile rubber, e.g., copolymer of butadiene and acrylonitrile, and mixtures thereof.

Further, non-limiting examples of elastomers for the reinforcement fibers include saturated rubbers that cannot be cured by sulfur vulcanization, such as, but not limited to, ethylene propylene rubber, e.g., copolymer of ethylene and propylene, ethylene propylene diene rubber, e.g., terpolymer of ethylene, propylene and diene-component, epichlorohydrin rubber, polyacrylic rubber, silicone rubber, fluorosilicon rubber, fluoroelastomers, perfluoroelastomers, polyether block amides, chlorosulfonated polyethylene, ethylene-vinyl acetate, and mixtures thereof.

Other non-limiting examples of elastomers include thermoplastic elastomers and polysulfide rubber.

It is contemplated that the elastomeric polymer can be a recycled material. As used herein and the claims, the terms "recycled", "recycle" and the like, refer to elastomeric polymer material that is scrap, trim or waste. That is, if the material was not employed in the invention to produce reinforcement fibers, the material would be considered unusable and would be disposed of appropriately, such as, but not limited to, being disposed of in a landfill.

The plurality of reinforcement fibers can include varying lengths. For example, as mentioned herein, each of the reinforcement fibers can have a length in the range from about 1/16-inch to about 3 inches. Without intending to be bound by any particular theory, it is believed that using fibers of different lengths allows for variable strain ranges in cement concrete that is placed and set. For example, shorter lengths assist in reinforcing or holding together smaller strain areas, while longer length fibers assist in bridging higher strain or movement in the cement concrete. Further, the plurality of reinforcement fibers can be composed of a recycled material that is re-purposed for use in cement concrete or manufactured as a new material specifically for use as reinforcement fibers in cement concrete.

In general, the elastomeric polymer fibers provide improved stability, durability and flexibility to asphalt cement concrete. For example, the elastomeric polymer fiber-reinforced asphalt cement concrete compositions of the present invention exhibit at least one of the following benefits as compared to conventional asphalt concretes: (i) reduces cracking, rutting, raveling, pot holes and other distresses in placed asphalt; (ii) reduces mix segregation; (iii) promotes self-healing; (iv) reduces drain down in Stone Matrix Asphalt, Porous Friction Courses, and open Graded Friction Courses mixes; (v) increases insulation value to reduce frost depth under placed cement concrete; (vi) assists in distribution of other different fibers; and (vii) results in quieter placed cement concrete.

As used herein, "self-healing" refers to the following phenomena: placed asphalt cement concrete contracts during cold weather and as a result, cracks are formed and, the elastomeric polymer reinforcement fibers are loaded in tension and remain in tension until warmer weather to assist in pulling the pavement back together. Therefore, promoting self-healing of the cracks.

In addition to the elastomeric polymer reinforcement fibers, the composition of the invention can also include non-elastomeric reinforcement fibers, e.g., a blend of elastomeric and non-elastomeric fibers. The non-elastomeric reinforcement fibers may be selected from a wide variety of reinforcement fibers known in the art, including synthetic fibers, such as, polymer fibers, e.g., polyolefin fibers, e.g., polyethylene and/or polypropylene fibers, polyester fibers, aramid fibers, polyamide fibers, polyvinyl-chloride fibers, nylon fibers and natural fibers, and mixtures thereof.

In general, reinforcement fibers can be used in various shapes, sizes, and forms. The reinforcement fibers, for example, can be flat, such as in the form of a sheet, or cylindrical, such as in the form of a tube or cord. The reinforcement fibers may include a deformation, such as a one or more crimps, in the flat or cylindrical length of the fiber. The deformation, e.g., crimp(s), can form a fiber having different shapes such as z-shaped, s-shaped, w-shaped and wedge-shaped fibers. In certain embodiments, loose fibers can be difficult to handle, and therefore, it may be desirable to configure and control the fibers, such as to improve the ease of handling, e.g., for adding the fibers to an asphalt mix. Accordingly, the sheets, tubes or cords can be bundled together in a container. The term "container" is used broadly to include a means of holding together the reinforcement fibers and, as such, can include a circumferential wrap or layer/film or a coating or a bag. The container can be composed of cellulose or polyolefin, such as polyethylene, polypropylene and mixtures thereof. The composition of the container can further include other additives, such as those typically used in preparing asphalt.

The fibers, individually or together in various combinations and proportions, can be fibrillated (i.e., pulled apart to form a net like structure) or non-fibrillated. The fibers can be configured in a predetermined number of twists and turns.

In the present invention, the denier of the reinforcement fibers can vary. For example, as mentioned herein, each of the reinforcement fibers can have a denier in the range from about 20 to about 1500. The denier can depend on the material composition of the reinforcement fibers, their configuration (e.g., monofilament, bundled, fibrillated, non-fibrillated, twisted, and turned), and their intended use or application.

The fibers may be cut to a predetermined length using conventional techniques and methods known for cutting fibers. In general, it is believed that longer fibers are capable of improved bonding in the asphalt cement concrete.

In accordance with certain embodiments of the invention, the reinforcement fibers are introduced, e.g., admixed, into an asphalt composition, e.g., mix, prior to field placement using various known methods, techniques and apparatus. The fibers can be introduced into the asphalt mix during one or more of various steps or locations in the manufacture process. For example, the reinforcement fibers can be added to a mixing machine or associated machinery, in a hopper, or in a transportation vehicle. In general, the reinforcement fibers can be added at any step or location in the process prior to field placement of the asphalt provided there is sufficient mixing that occurs in the step or at the location to adequately incorporate the reinforcement fibers into the asphalt mix.

As mentioned, the reinforcement fibers can be added as individual fibers or in bundles and containers to the asphalt mix during the manufacturing process. When added in containers, each container can hold elastomeric and non-elastomeric reinforcement fibers or each container can hold either elastomeric fibers or non-elastomeric fibers. The container can be operable to hold the reinforcement fibers and then to release them as needed. Thus, the container can be composed of a material that is capable of at least partially melting, dissolving, or disintegrating, e.g., breaking apart, to release the reinforcement fibers when combined and mixed with the asphalt mix. In certain embodiments, the container may be constructed of a material such that when subjected to mixing and/or agitation, e.g., mixing blades of the mixing machine, the container at least partially breaks apart and is dispersed within the mix. In another embodiment, the container may be constructed of a material such that when subjected to heating, which reaches or exceeds its transition or melting temperature, the container at least partially melts and/or dissolves, and is dispersed within the asphalt mix.

In certain embodiments, air or pneumatics, e.g., an air or a pneumatic transport device, may be used to introduce and distribute the reinforcement fibers into the asphalt mix. In these embodiments, the reinforcement fibers can be essentially blown into the asphalt mix. Suitable transport devices are known in the art and can be employed as-is or can be adapted for particular conditions. Without intending to be bound by any particular theory, it is believed that employing the mechanism of air or pneumatics (as compared to, for example, manual addition) to incorporate the reinforcement fibers into the asphalt mix provides improved distribution and dispersion of the reinforcement fibers. Typically, the transport device is part of, e.g., an integral part of, or is connected to one or more parts (e.g., apparatus, piping or the like) of the asphalt manufacturing equipment. Further, the transport device typically includes an input reservoir or pipe to receive the reinforcement fibers and an output tube or pipe to discharge and feed the reinforcement fibers into the asphalt mix.

In accordance with the present invention, the use of elastomeric polymer reinforcement fibers can result in at least one of improved strength, durability, toughness, integrity, and self-healing upon field placement of the resulting reinforced asphalt, as compared to a reinforced asphalt produced by employing reinforcement fibers which do not include elastomer.

In addition to the reinforcement fibers, the compounds used in producing asphalt include, but are not limited to, aggregate and binder, e.g., liquid asphalt.

The manufacture of asphalt cement concrete consists of employing a thermal process and therefore, includes heating the ingredient, e.g., aggregate and liquid asphalt, in the chamber of an asphalt mixing machine. The temperature of the asphalt cement concrete composition can vary and can include those temperatures typically used in commercially-operated asphalt manufacturing facilities. In an embodiment of the present invention, the temperature can be within a range of about ambient temperature to about 375° F.

The reinforcement fibers can be added to the asphalt mix in varying amounts. Typically, the amount added is such that desired properties of the asphalt are achieved. In certain embodiments, the reinforcement fibers can be at most 5.0 percent or greater by volume per ton of the asphalt mix. In yet another embodiment of the invention, the reinforcement fibers can be in a range from about 0.0065 percent to about 5.0 percent by volume per ton of the asphalt mix. In certain embodiments, a one pound package, metered and dosed, of the reinforcement fibers is added to the asphalt mix.

The reinforced asphalt cement concrete of the invention can be used in a wide variety of applications, for example, in structural pavements, airport runways and tarmacs, bridge deck overlays, floors, and like asphalt products. The reinforced asphalt of the invention may also be used for repair, rehabilitation, retrofit, and renovation of existing products or structures, such as, for example, in overlays, micro-surfacing and repairs of airport pavements, bridge decks, parking areas, roadways, and the like, including patching and filling potholes.

In addition to reinforcement, incorporation of the elastomeric polymer reinforcement fibers of the present invention in asphalt modifies the cracking mechanism and reduces the propagation of micro-cracking caused by a number of factors. It is believed that relative to non-reinforced asphalt, the resultant cracks of fiber reinforced asphalt of the present invention are smaller in width, the permeability of the material is reduced, and the ultimate cracking strain is enhanced. Furthermore, the elastomeric polymer fibers employed in the present invention are capable of carrying a load across the crack. As a result, the asphalt may have at least one change in its material properties, such as toughness, residual load carrying ability after the first crack, and impact resistance. Moreover, it is believed that the elastomeric polymer reinforcement fibers used in the present invention produce an asphalt having improved strength compared to non-reinforced cement concrete or cement concrete reinforced in the absence of elastomeric polymer reinforcement fibers, such that the asphalt of the present invention can be suitable for locations where the asphalt will experience both high and low temperatures and areas subjected to heavy loadings (e.g., high traffic areas) and heavy concentrations of truck traffic as well as many other uses.

One example of reinforcement fibers in accordance with the invention include elastomeric polymer reinforcement fibers known under the trade name FORTA FLEX, which are available from Forta Corporation in Grove City, Pa.

The elastomeric polymer fibers suitable for use in the present invention are different and distinguishable from known reinforced cement concrete that includes ground rubber tires. It is known in the art to grind rubber tires, i.e., used or worn out, and use the ground rubber tire aggregate or particulate in cement concrete compositions. This material does not exhibit the elastomeric properties nor the fiber form nor the aspect ratio associated with the reinforcement fibers of the invention and therefore, ground rubber tires, and rubber aggregate or rubber particulates produced therefrom, are not considered suitable for use in the invention.

EXAMPLES

The performance of elastomeric polymer reinforcement fibers in placed concrete under cold weather conditions was simulated as follows. Elastomeric polymer (spandex) fibers were purchased as scrap material having varying denier and cut into varying lengths. There was added 3 grams of the elastomeric polymer reinforcement fibers to a 4-inch diameter container having a 1-inch depth. The container was filled with water and then set in a freezer until frozen solid. A control sample was made using the same process with the exception that the control sample did not include any of the reinforcement fibers.

After freezing was complete, the control sample was dropped from a height of 4 feet onto a concrete floor. The control sample shattered into many pieces. The elastomeric polymer fiber-reinforced sample was dropped three times from the same height. Micro-cracking in the specimen was visually observed but no pieces broke off, and the original shape of the sample was maintained. The fiber sample was then forcibly thrown down onto the concrete floor in an effort to break the sample. Only small pieces or chips broke off around the edges of the sample. The small pieces or chips were essentially equivalent in size to ice chips in a snow cone. The sample was then thrown over hand, like a baseball, at concrete steps. As a result, the sample maintained its shape with no chunks or pieces breaking off, and it rolled down the steps.

In a trial project, about 30 pounds of elastomeric polymer fiber (spandex)-reinforced cement concrete was placed to form new pavement over existing pavement. The approximate length of the test section was 150 feet at a ⅝-inch depth. The reinforcement fibers mixed well in the micro-surfacing material and no problems were encountered. It was visually observed that the fibers bonded well with the asphalt emulsion. The fibers took on the color of the asphalt. Field observations showed that in some places the fibers aligned in the direction of paving. Fiber alignment contributes to good quality specifically for retarding Transverse Reflective Cracking (TRC), which is caused by existing cracks (perpendicular to the direction of travel, usually caused by existing old concrete slab pavement), in the pavement layers below the surface of new pavement. These existing cracks can then migrate through the new pavement layer. The reinforcement fibers when placed in the new layer will be positioned perpendicular to the potential area of TRC helping to prevent and retard cracking, and heal the pavement.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A fiber-reinforced asphalt composition, comprising:
   asphalt; and
   a plurality of reinforcement fibers composed of elastomeric polymer, and absent of material selected from the group consisting of ground rubber tire, tire aggregate and tire particulate,
   wherein the elastomeric polymer is a recycled material.

2. The asphalt composition of claim 1, wherein the elastomeric polymer comprises synthetic polymer containing polyurethane.

3. The asphalt composition of claim 2, wherein the elastomeric polymer comprises spandex.

4. The asphalt composition of claim 1, wherein the plurality of reinforcement fibers has an aspect ratio from about 20 to about 5000, a denier from about 20 to about 1500, and a length from about 1/16-inch to about 3 inches.

5. The asphalt composition of claim 1, wherein the elastomeric polymer is selected from the group consisting of natural polyisoprene and synthetic polyisoprene.

6. The asphalt composition of claim 1, wherein the elastomeric polymer is selected from the group consisting of polybutadiene, chloroprene rubber, polychloroprene rubber, butyl rubber, styrene-butadiene rubber, nitrile rubber and mixtures thereof.

7. The asphalt composition of claim 1, wherein the elastomeric polymer is selected from the group consisting of ethylene propylene rubber, ethylene propylene diene rubber, epichlorohydrin rubber, polyacrylic rubber, silicone rubber, fluorosilicon rubber, fluoroelastomers, perfluoroelastomers, polyether block amides, chlorosulfonated polyethylene, ethylene-vinyl acetate and mixtures thereof.

8. The asphalt composition of claim 1, wherein the reinforcement fibers are in the form of individual fibers, one or more bundles, one or more containers and combinations thereof.

9. The asphalt composition of claim 1, wherein the fiber-reinforced asphalt composition further comprises non-elastomeric reinforcement fibers.

10. The asphalt composition of claim 9, wherein the non-elastomeric reinforcement fibers are selected from the group consisting of polyolefin fibers, aramid fibers, and mixtures thereof.

11. The asphalt composition of claim 9, wherein the plurality of reinforcement fibers composed of elastomeric polymer serve as a carrier for the non-elastomeric reinforcement fibers.

12. A fiber-reinforced asphalt, comprising:
    asphalt cement;
    a plurality of reinforcement fibers composed of elastomeric polymer, and absent of material selected from the group consisting of ground rubber tire, tire aggregate and tire particulate; and
    aggregate,
    wherein the elastomeric polymer is a recycled material, and
    wherein the plurality of reinforcement fibers promotes healing of cracks formed within field-placed fiber-reinforced asphalt.

13. The asphalt of claim 12, wherein said reinforcement fibers have an ability in the field-placed fiber-reinforced asphalt to stretch beyond their original shape and then to subsequently resume their original shape to heal cracks.

14. A method of preparing fiber-reinforced asphalt, comprising:
    providing asphalt;
    providing aggregate;
    providing a plurality of reinforcement fibers composed of elastomeric polymer, and absent of material selected from the group consisting of ground rubber tire, tire aggregate and tire particulate; and
    introducing and distributing the reinforcement fibers into the aggregate in the asphalt to produce the fiber-reinforced asphalt,
    wherein the elastomeric polymer is a recycled material.

* * * * *